United States Patent [19]

Nelson

[11] Patent Number: 4,953,320

[45] Date of Patent: Sep. 4, 1990

[54] HEATED COCKROACH TRAP

[76] Inventor: Lawrence L. Nelson, 125 Royal Dr., Apt. 2408, Madison, Ala. 35758

[21] Appl. No.: 408,118

[22] Filed: Sep. 15, 1989

[51] Int. Cl.$^5$ .............................................. A01M 1/02
[52] U.S. Cl. ...................................... 43/121; 43/132.1
[58] Field of Search .............. 43/107, 121, 124, 132.1, 43/58, 112, 144

[56] References Cited

U.S. PATENT DOCUMENTS

| | | | |
|---|---|---|---|
| 222,134 | 12/1879 | Herschman | 43/121 |
| 1,839,247 | 1/1932 | Moore | 43/112 |
| 4,551,941 | 11/1985 | Schneidmiller | 43/121 |
| 4,669,216 | 6/1987 | Moss | 43/144 |
| 4,817,329 | 4/1989 | Forbes | 43/132.1 |

Primary Examiner—Richard K. Seidel
Assistant Examiner—James Miner
Attorney, Agent, or Firm—Phillips & Beumer

[57] ABSTRACT

A cockroach trap is constructed to attract and kill cockroaches by providing a confined space between nested metal cups and including means for heating the space continuously to a first temperature such as 70° to 90° F. that is attractive to cockroaches and periodically heating to a temperature such as 180° to 200° F. that kills them. The two cups are stacked one inside the other with spacers between the cups. An electrical heating element is disposed circumferentially around the outside of the outer cup to provide the first temperature, and other elements in heat transfer relation with both of the cups providing the second temperature. Attractants such as pheremones, food scraps, or bait, along with water, may be provided at the bottom of the confined space. The inner cup may be readily lifted out to enable removal of dead cockroaches.

20 Claims, 2 Drawing Sheets

HEATED COCKROACH TRAP

FIELD OF THE INVENTION

This invention relates generally to insect traps and more particularly to cockroach traps.

BACKGROUND OF THE INVENTION

Cockroaches (insect order phasmida, suborder blattaria) present a continuing problem in areas of human habitation and especially where cleanliness is highly important, such as hospitals, restaurants, and food warehouses as well as in homes. Cockroaches are known to carry and spread disease-causing organisms both by external adhesion and by being passed through the gut as excrement. Passage through the gut has been shown for bacilli causing tuberculosis, typhus, paratyphus, dysentery, and anthrax, as well as pus-generating staphylococci and *escherichia coli* and *vibor comma*, which causes cholera. More problematic of cockroach infestation is the cockroach's tendency to spread filth and to carry food-decaying organisms. Filth in the form of excrement and decay-causing organisms become spread to foods as the cockroach roams in search of meals.

One method currently marketed to control cockroach infestation is the use of poisons. Poisons can be spread over large areas that many cockroaches will come into contact with. The cockroach will carry the poison until the next time it cleans itself, at which time the poison will be ingested and kill the cockroach. The intention is for some of the poison to be spread back to the nest so that others may be killed. Cockroaches have proven difficult to control through poison due to their ability to develop immunity traits. A poison may be very effective on the cockroach population in a specific area when it is first introduced. Previous usage has shown, however, that some of the cockroaches will survive the poison due to an inherited immunity. Those cockroaches will then breed a population of cockroaches that are immune to that poison. A different poison can be introduced to the population and will also be initially effective, but eventually a group of cockroaches will arise immune to that poison as well. This makes poisons only temporarily effective in controlling infestation.

Another disadvantage of poisons is that poisons meant to control the cockroach population may cause health problems for humans living in the same area. Even if the poison is used away from living areas, the cockroach can spread the poison to foods while it is roaming. The poisons can also become spread through winds, washing, or normal human activity. Another problem inherent in the use of poisons is that the cockroaches killed by the poisons may be eaten by other insects or animals and become spread up the food chain.

In addition to poisons, adhesive traps have been developed and marketed to control cockroach infestation. A very strong adhesive substance is placed inside a trap and alluring foods or chemicals are placed inside to attract the cockroach. The cockroach then becomes stuck to the adhesive and unable to escape, dying while stuck inside the trap. These adhesive traps have proved relatively ineffective on cockroaches due to the speed and strength of the cockroaches.

Various electrified insect traps that employ a high-voltage potential between electrical conductors are also known in the prior art as exemplified by U.S. Pat. Nos. 4,179,839 and 4,186,512. Such devices, however, may present a potential electrical shock hazard in some applications.

SUMMARY OF THE INVENTION

The present invention is directed to an insect trap, especially for cockroaches, that includes a confined space provided with means for attracting cockroaches and with means for periodically heating the confined space to a temperature high enough to kill the cockroaches once attracted therein. The means for attracting the cockroaches may take the form of the shape, size, and inclination of the confined space itself, an electrical heating element for continuously heating the space to a temperature slightly above room temperature, chemicals such as pheremones, bits of food or bait and/or a small amount of water such as to provide a damp, humid environment. These measures provide an atmosphere in the confined space that induces cockroaches to remain there until they are killed by the periodically applied high temperature. A first heating element wired directly to an A.C. power line may be used to provide cockroach-attracting temperature, and a second element or elements coupled to a timer and current switch may be activated periodically for a predetermined period to provide the killing temperature. In a preferred embodiment arrangement, several (for example, five) traps would be connected to a single power control and timer separate from the traps. Traps embodying the invention avoid the above-discussed problems associated with poisons and offer an attractive alternative to traps using high-voltage shock to kill insects.

It is, therefore, an object of this invention to provide a cockroach trap that includes means for attracting and killing cockroaches without use of high-voltage shocks.

Another object is to provide a method of killing cockroaches that is not subject to inherited immunity on the part of the cockroach.

DESCRIPTION OF THE PREFERRED EMBODIMENT

Figure 1:
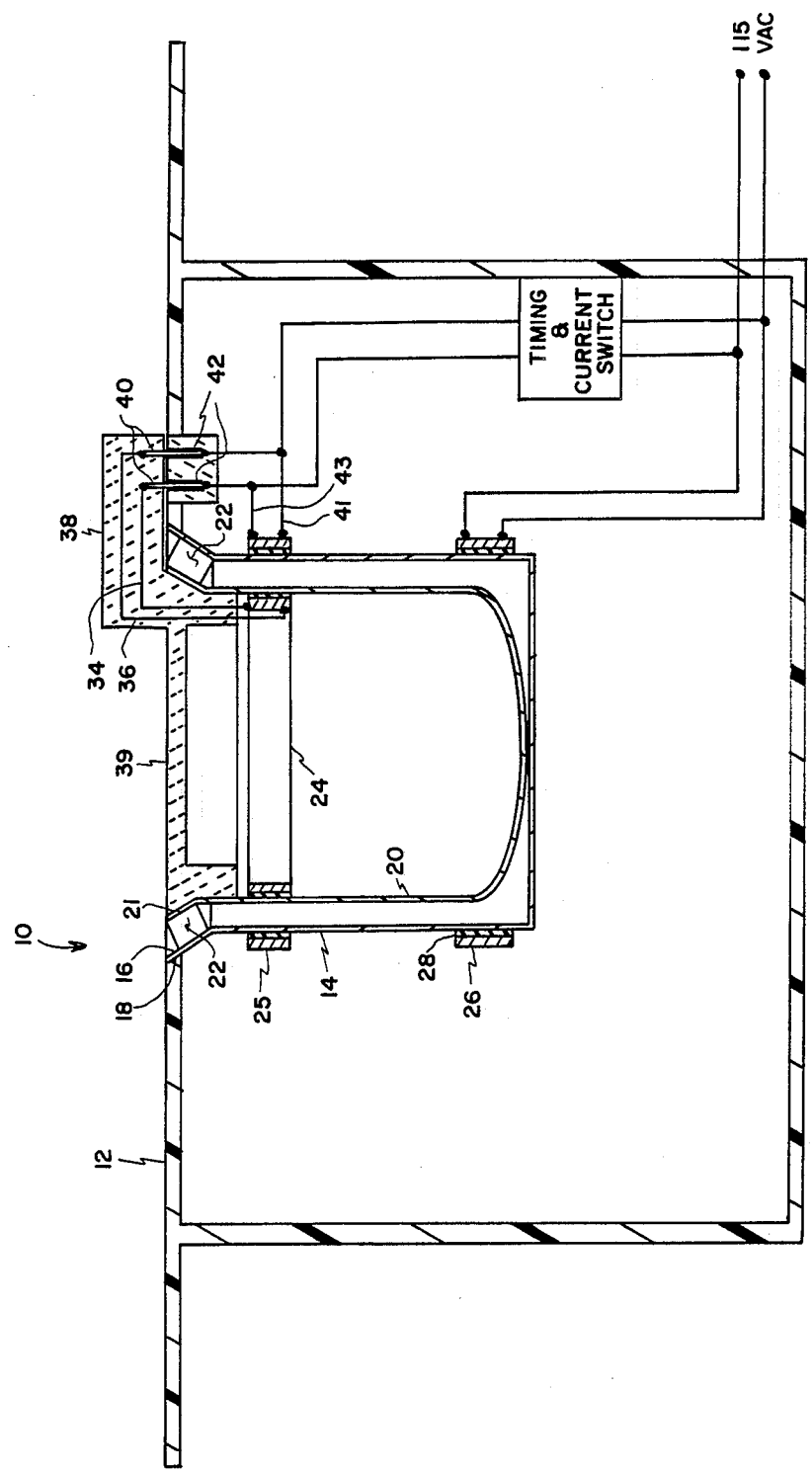
FIG. 1 is a cut-away view, partially schematic, showing a cockroach trap embodying the invention.

Referring to FIG. 1 of the drawings, there is shown a cockroach trap 10 mounted in a housing 12 in the form of a generally rectangular box. The trap has two concentric cylindrical cups, an outer cup 14 with an outward extending flange 16 at the top that engages a circular aperture 18 in housing 12 and an inner cup 20 having a flange 21 that is nested within the outer cup and is supported in spaced-apart relation therefrom by tabs 22 engaging flange 16. Cups 14 and 20 are spaced apart a distance such as to provide downward-extending, confined openings, narrowing to a wedge-shaped region at the bottom, that space by its very size, placement, and shape attract cockroaches through their natural affinity for tight places, a distance of ¼ to ½ inch between cups being suitable for this purpose. The outer cup may be made of a high thermal conductivity material such as aluminum, and the inner cup may have a lower portion below the heating element made of aluminum and the remainder made of low thermal conductivity material such as ceramic or ceramic-coated aluminum.

Figure 4:
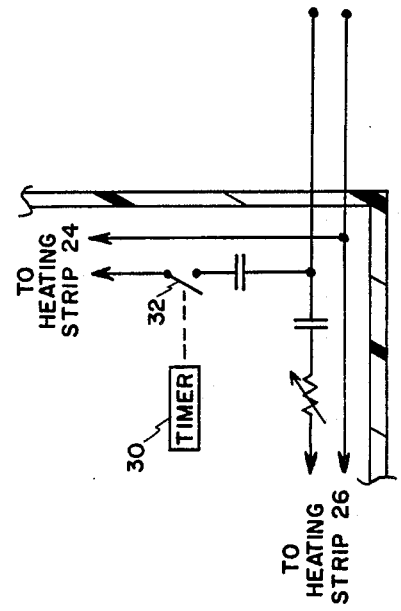
FIG. 4 is a schematic view showing means for providing power to heating strips of the trap.

In order to provide required heating of the confined spaces between cups, two heating elements 24 and 26 are provided. Heating element 26, disposed around the circumference of and near the bottom of outer cup 14, is connected directly to a 115-volt A.C. line as shown for continuous operation when plugged in. An insulating strip 28 of material such as mica is provided to electrically isolate the heating element from the cup. Heating element 26 has a size and electrical resistance selected to heat the space between cups to an effective cockroach attractive temperature, which may be from slightly above room temperature, with 70° to 90° F. being preferred. The temperature provided by this heating element may be controlled or adjusted by means as shown in FIG. 4.

Heating element 24, disposed around the circumference of and inside inner cup 20, and heating element 25 in opposed relation thereto outside of outer cup 14, provide heating of the confined space as required for killing the cockroaches that have been attracted into the space. These elements are coupled to a 115-volt A.C. source through a timer 30 and current switch 32 to provide for intermittent operation at adjustable predetermined intervals such as being turned on for a period of five minutes once every 1 to 12 hours. The current provided to this element and size and characteristics of the element are selected to heat the confined space to a temperature such as 180° to 200° F. that is effective to kill cockroaches when maintained for the stated period. Upon expiration of this period, elements 24 and 25 are turned off by current switch 32 (FIG. 4), and the temperature in the confined space drops down to that provided by element 26. Conventional digital or analog timers may be used.

Wires 34 and 36, connected to heating element 24, are embedded in a plug 38 secured to inner cup 20 integral with cover 39 extending over outer cup 14. The plug has male prongs 40 that are insertable in female receptacle 42 that in turn is coupled to the output of current switch 32. Wires 41 and 43 couple heating element 25 to the current switch.

In operation of the trap, cockroach attractants such as pheremones, bits of food, or other bait, along with a small amount of water, may be placed in the confined space between cups at the bottom of the outer cup. Heating of this space as described above causes pheremones and bait scents to be lofted into the surrounding area, further enhancing their attractant effect. When dead cockroaches accumulate in the confined space, they may be readily removed by lifting up inner cup 20, giving ready access to the interior of outer cup 14 wherein they are contained. The outer cup 14 can also be removed for easily dispensing dead cockroaches.

Figure 2:
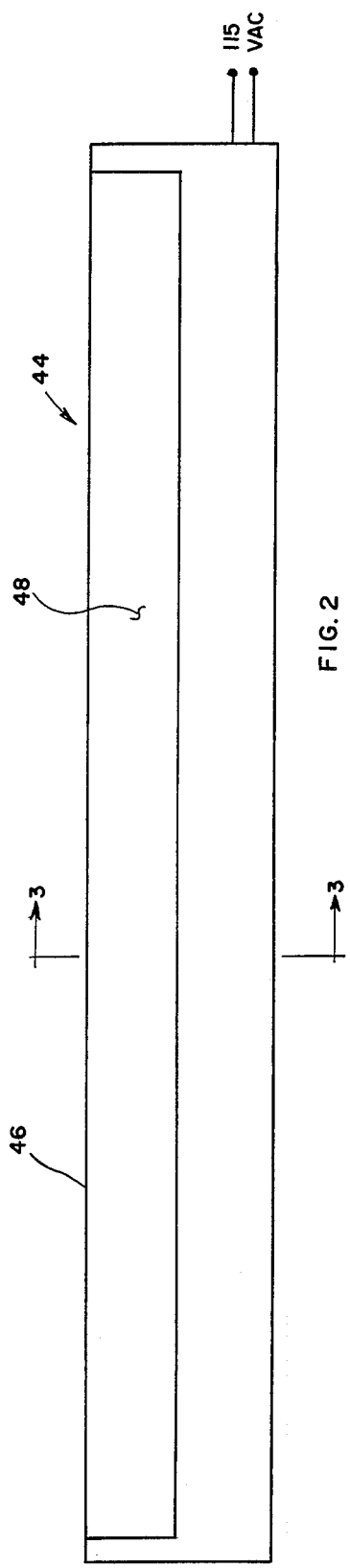
FIG. 2 is a planar side view showing another embodiment.
Figure 3:
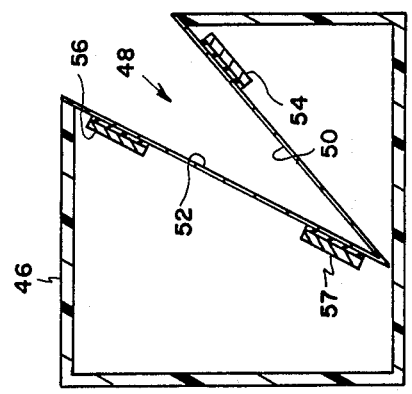
FIG. 3 is a sectional view taken along line 3—3 of FIG. 2.

FIGS. 2 and 3 show an embodiment wherein a cockroach trap 44 is provided in the form of an elongated rectangular box 46 having a V-shaped notch 48 extending along its length. The notch is defined by walls 50 and 52 that extend downward from the top and upper side surfaces, respectively, of the box. Heating elements 54 and 56 extend along the length of the box near the mouth of the notch. These elements are connected to a current switch as described above to provide the periodic high-temperature heating. Element 57 extends along the length of the box near the bottom of the notch and is connected directly to a 115-volt A.C. line to provide the cockroach attractant temperature. The elements in this embodiment may be coupled to an outside power line, timer, and current switch using the same components and connections as shown for the embodiment of FIG. 1.

My experimentation has demonstrated that cockroaches are much more likely to enter a crevice that is directed downward as shown in the above-described embodiments rather than upward, laterally or otherwise. Experimentation has also shown that heating a region of a confined area that lies between cockroaches and an escape route creates a heated barrier that they will not traverse, even to escape.

The embodiments described above include a heating element for providing a cockroach-attracting temperature as well as elements for heating the confined space to a cockroach killing temperature. It is to be understood, however, that one or more of the other measures given for attracting cockroaches may be employed without heating the confined space to a cockroach-attracting temperature. Thus, the heating element provided for that purpose may be omitted within the scope of the invention.

While the invention is described above in terms of trapping and killing cockroaches, it is to be understood that it may also be applied to killing other insects. Also, the invention is not to be limited to the embodiments described but only as indicated by the following claims.

I claim:

1. An insect trap comprising:
    means defining a confined space;
    means for attracting insects into said confined space; and
    means for periodically heating said space at predetermined intervals to a temperature high to kill the insects attracted therein.

2. An insect trap as defined in claim 1 wherein said heating means comprises at least one electrical resistance heating strip adapted to heat said space at a temperature of 180° to 200° F.

3. An insect trap as defined in claim 2 wherein said means for attracting insects comprises a confined space including a wedge-shaped portion.

4. An insect trap as defined in claim 3 wherein said means defining a confined space comprises first and second metal cups spaced apart a distance such as to attract insects therein.

5. An insect trap as defined in claim 3 wherein said means defining a confined space comprises a longitudinally extending enclosed notch.

6. An insect trap as defined in claim 1 wherein said means for attracting insects comprises at least one electrical resistance heating strip adapted to continuously heat said space to an insect-attracting temperature.

7. An insect trap as defined in claim 6 wherein said means for attracting insects includes pheremones, food particles, baits, or water, or combinations thereof.

8. A cockroach trap comprising:
    means defining a confined space;
    first heating means for continuously heating said space to a first temperature that is attractive to cockroaches; and
    second heating means for heating said space at predetermined intervals to temperatures sufficiently high to kill cockroaches attracted therein.

9. A cockroach trap as defined in claim 8 wherein said means defining a confined space comprises first and second metal cups spaced apart a distance such as to attract cockroaches therein.

10. A cockroach trap as defined in claim 9 wherein said distance between cups is ¼ to ½ inch.

11. A cockroach trap as defined in claim 9 wherein said first heating means comprises a first electrical heating element disposed in heat transfer relation with the outside of the outermost of said nested cups and adapted to be operatively connected to a source of alternating current.

12. A cockroach trap as defined in claim 11 wherein said second heating means comprises a pair of electrical elements disposed in heat transfer relation with said cups and timing means coupling said pair of elements to a source of alternating current for being operated at predetermined intervals for periods of times sufficient to kill cockroaches attracted therein.

13. A cockroach trap as defined in claim 12 including means for supporting said cups in spaced apart relation from one another.

14. A cockroach trap as defined in claim 13 including strips of electrical insulation with high thermal conductivity disposed between said cups and said heating elements.

15. A cockroach trap as defined in claim 14 wherein said cups define a downward extending, wedge-shaped, confined space.

16. A cockroach trap as defined in claim 8 wherein said means defining a confined space comprises an elongated, generally rectangular box having an enclosed, longitudinally extending, enclosed notch extending downward therein.

17. A method of killing cockroaches which comprises:
   providing a pair of nested metal containers defining a confined space therebetween;
   continuously heating said confined space to a first temperature that is attractive to cockroaches; and
   periodically heating said confined space to a second temperature sufficiently high enough to kill cockroaches attracted therein.

18. The method of claim 17 wherein said first temperature is 70° to 90° F.

19. The method of claim 18 wherein said second temperature is 180° to 200° F.

20. The method of claim 19 including placing a cockroach-attracting substance in the group consisting of pheremones, food scraps, baits, and water, or combinations thereof, in said confined spaced.

* * * * *